United States Patent
Peng

(10) Patent No.: US 9,563,593 B2
(45) Date of Patent: Feb. 7, 2017

(54) PERIPHERAL COMPONENT INTERCONNECT ADAPTER AND COMPUTER USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Zheng-Quan Peng, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 642 days.

(21) Appl. No.: 14/012,949

(22) Filed: Aug. 28, 2013

(65) Prior Publication Data

US 2014/0164663 A1  Jun. 12, 2014

(30) Foreign Application Priority Data

Dec. 11, 2012  (CN) .......................... 2012 1 0529765

(51) Int. Cl.
| | |
|---|---|
| G06F 13/00 | (2006.01) |
| G06F 13/40 | (2006.01) |
| G06F 1/28 | (2006.01) |
| G06F 11/32 | (2006.01) |
| G06F 11/07 | (2006.01) |

(52) U.S. Cl.
CPC ............. *G06F 13/4068* (2013.01); *G06F 1/28* (2013.01); *G06F 11/0751* (2013.01); *G06F 11/32* (2013.01); *G06F 11/326* (2013.01)

(58) Field of Classification Search
CPC ................ G06F 13/382; G06F 13/4081; G06F 2213/0026
USPC .......................................... 710/300–306, 310
See application file for complete search history.

(56) References Cited

U.S. PATENT DOCUMENTS

| | | | | |
|---|---|---|---|---|
| 5,712,754 A | * | 1/1998 | Sides .................. | G06F 13/4081 361/18 |
| 7,447,822 B2 | * | 11/2008 | Wu ..................... | G06F 13/4081 710/104 |
| 2003/0101305 A1 | * | 5/2003 | Kang .................. | G06F 13/4081 710/303 |
| 2007/0214301 A1 | * | 9/2007 | Chen ................... | G06F 13/4081 710/301 |

(Continued)

*Primary Examiner* — Tim T Vo
*Assistant Examiner* — Kim T. Huynh
(74) *Attorney, Agent, or Firm* — Zhigang Ma

(57) ABSTRACT

A peripheral component interconnect (PCI) adapter includes a PCI connector for connecting to a PCI slot of a motherboard, a first PCI expansion slots for connecting a first PCI card, a second PCI expansion slot for connecting a second PCI card, a detection control circuit connected to the first PCI expansion slot and the second PCI expansion slot, and an alarm circuit connected to the detection control circuit. The detection control circuit detects operation power of the first PCI card and the second PCI card, and controls the alarm circuit to report a fault alarm when the operation power of the first PCI card exceeds a threshold power of the first PCI expansion slot or the operation power of the second PCI card exceeds a threshold power of the second PCI expansion slot.

18 Claims, 1 Drawing Sheet

(56) References Cited

U.S. PATENT DOCUMENTS

2008/0065805 A1* 3/2008 Wu .................... G06F 1/186
                                                    710/301

* cited by examiner

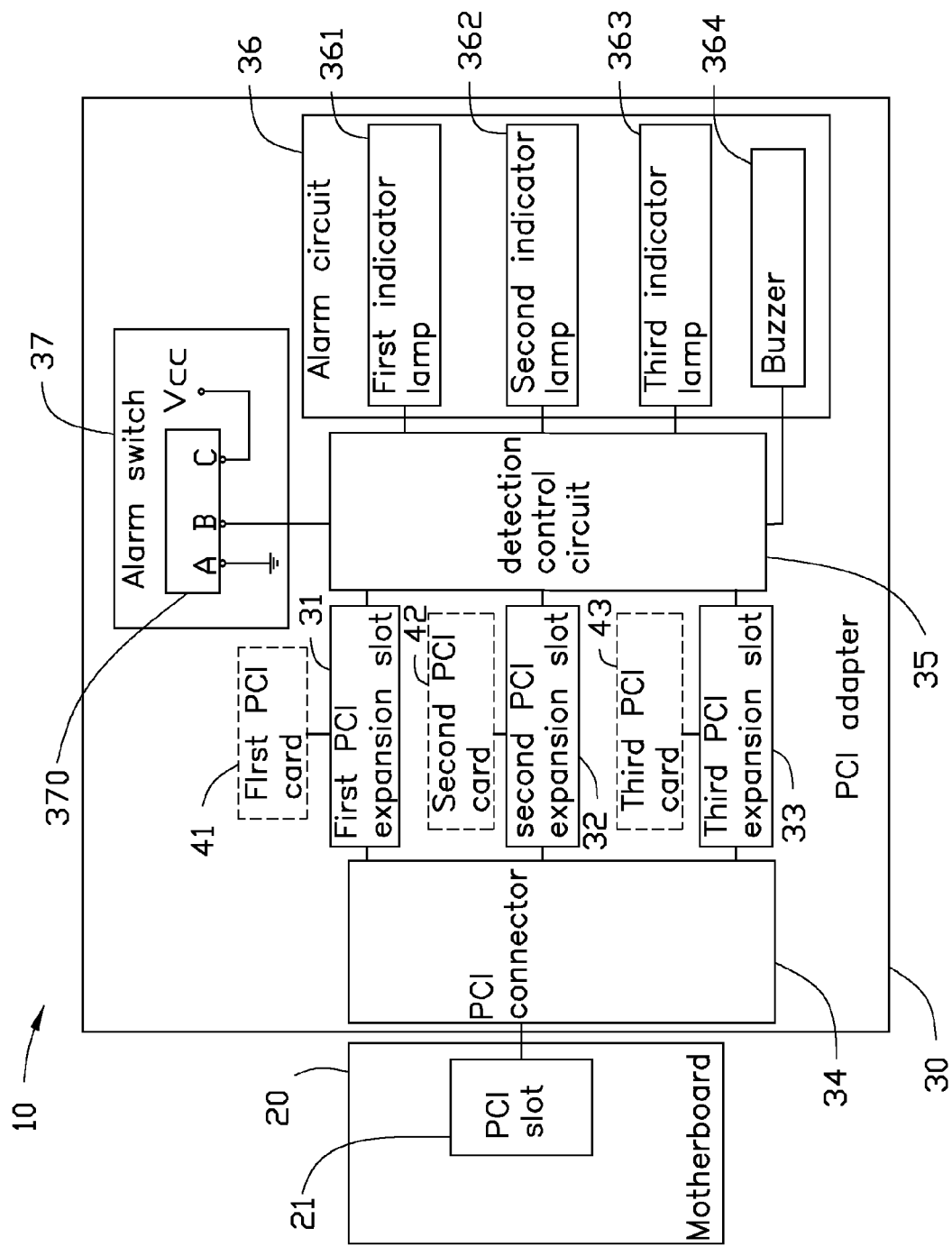

PERIPHERAL COMPONENT INTERCONNECT ADAPTER AND COMPUTER USING SAME

CROSS-REFERENCE TO RELATED APPLICATIONS

This application claims all benefits accruing under 35 U.S.C. §119 from China Patent Application No. CN201210529765.5, filed on Dec. 11, 2012, in the China Intellectual Property Office, the disclosure of which is incorporated herein by reference.

BACKGROUND

1. Technical Field

The present disclosure relates to computer technologies, and more particularly, to a peripheral component interconnect (PCI) adapter for a computer.

2. Description of Related Art

A computer includes a motherboard with several PCI slots, and a PCI card can be attached into the PCI slot to provide an expansion function for the computer. Normally, a number of the PCI slots in the motherboard is limited, for example, a typical motherboard can only provide three or four PCI slots. However, a user may desire to install more PCI cards to improve function of the computer, however, this is impracticable due to the limited number of the PCI slots.

What is needed, therefore, is to provide a means that solve the problem discussed above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 is a schematic block diagram of a computer according to an embodiment of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 1 shows a computer 10 according to an embodiment of the present disclosure. The computer 10 includes a motherboard 20, a PCI adapter 30 and a plurality of PCI cards including a first PCI card 41, a second PCI card 42, and a third PCI card 43. The motherboard 20 may include a plurality of PCI slot 21, and only one of the PCI slots 21 is schematically illustrated in FIG. 1. Each of the PCI slots 21 may be one selected from a PCI express (PCI-E) slot, a PCI extended (PCI-X) slot, a PCI Accelerated Graphics Port (PCI-AGP) slot and a conventional PCI slot. The PCI adapter 30 may be connected to the illustrated PCI slot 21 and provide at least two PCI expansion slots, in the present embodiment, the PCI expansion slots includes a first PCI expansion slot 31, a second PCI expansion slot 32 and a third PCI expansion slot 33.

Each of the PCI cards may be one selected from a PCI-E card, a PCI-X card, a PCI-AGP card, and a conventional PCI card. In the present embodiment, the first PCI card 41, the second PCI card 42 and the third PCI card 43 are respectively plugged into the first PCI expansion slot 31, the second PCI expansion slot 32 and the third PCI expansion slot 33. It is noted, however, that the PCI cards included in the computer 10 are not limited to the first PCI card 41, the second PCI card 42 and the third PCI card 43 in practice; for example, the computer 10 may include other PCI cards that are plugged into the non-illustrated PCI slots 21 in the motherboard 20. Moreover, the PCI cards 41, 42, 43 may be a video card, a sound card, a memory card, a network card, a TV tuner card, or the like.

The PCI adapter 30 may further include a PCI connector 34, a detection control circuit 35, and an alarm circuit 36. The PCI connector 34 may be plugged into the illustrated PCI slot 21 in the motherboard 20, and is further connected to the first PCI expansion slot 31, the second PCI expansion slot 32 and the third PCI expansion slot 33. The interconnection of the PCI connector 34 and the PCI slot 21 in the motherboard 20 may enable communication between the PCI cards 41, 42, 43 plugged into the PCI expansion slots 31, 32, 33 and the motherboard 20.

The detection control circuit 35 is connected between the PCI expansion slots 31, 32, 33 and the alarm circuit 36. The detection control circuit 35 may detect operation power of the first PCI card 41, the second PCI card 42 and the third PCI card 43, and determine whether the detected operation power exceeds threshold power of the first PCI expansion slot 31, the second PCI expansion slot 32 and the third PCI expansion slot 33. Upon determining that the operation power of one of the PCI cards 41, 42, 43 exceeds the threshold power of the corresponding PCI expansion slot 31, 32, 33, the detection control circuit 35 may implement an alarm control function, for example, the detection control circuit 35 may control the alarm circuit 36 to report a fault alarm.

For example, the alarm circuit 36 may include a buzzer 364 and a plurality of fault indicators including a first indicator lamp 361, a second indicator lamp 362 and a third indicator lamp 363. The indicator lamps 361, 362, 363 and the buzzer 364 are electrically connected to the detection control circuit 35. Each of the indicator lamps 361, 362, 363 corresponds to a respective one of the PCI expansion slots 31, 32, 33.

When the detection control circuit 35 determines the operation power of the first PCI card 41 exceeds the threshold power of the first PCI expansion slot 31, the detection control circuit 35 outputs a first control signal to control the alarm circuit 36 to light the first indicator lamp 361 or to make the first indicator lamp 361 flicker.

When the detection control circuit 35 determines the operation power of the second PCI card 42 exceeds the threshold power of the second PCI expansion slot 32, the detection control circuit 35 outputs a second control signal to control the alarm circuit 36 to light the second indicator lamp 362 or to make the second indicator lamp 362 flicker.

When the detection control circuit 35 determines the operation power of the third PCI card 43 exceeds the threshold power of the third PCI expansion slot 33, the detection control circuit 35 outputs a third control signal to control the alarm circuit 36 to light the third indicator lamp 363 or to make the third indicator lamp 363 flicker.

Moreover, when the detection control circuit 35 determines that the operation power of one of the PCI cards 41, 42, 43 exceeds the threshold power of the corresponding PCI expansion slot 31, 32, 33, the detection control circuit 35 may also output a buzzer control signal to control the alarm circuit 36 to ring the buzzer 364, such that the user of the computer can be aware of the fault alarm.

Optionally, the PCI adapter 30 may further include an alarm switch 37 for enabling or disabling the detection control circuit 35 and the alarm circuit 36, and in addition, the detection control circuit 35 includes a control terminal for receiving an enablement signal or a disablement signal from the alarm switch 37.

For example, the alarm switch 37 may include a three-terminal key 370, the three-terminal key 370 includes a first terminal A being grounded, a second terminal B electrically connected to the control terminal of the detection control circuit 35, and a third terminal C electrically connected to a power voltage VCC. The power voltage can for example be a direct-current (DC) voltage of 5V or 3.3V.

When the three-terminal key 370 is pressed, the second terminal B is electrically connected to the third terminal C, and thus the power voltage VCC is transmitted to the second terminal B; the power voltage VCC serves as the enablement signal and is output to the detection control circuit 35 to enable the alarm control function of the detection control circuit 35.

When the three-terminal key 370 is released, the second terminal B is electrically connected to the first terminal A, and thus a ground voltage is transmitted to the second terminal B; the ground voltage serves as the disablement signal and is output to the detection control circuit 35 to disable the alarm control function of the detection control circuit 35.

In the present embodiment, the PCI adapter 30 can provide the PCI expansion slots 31, 32, 33 for installing more PCI cards 41, 42, 43, and thus the PCI capability of the computer 10 is improved. Moreover, the detection control circuit 35 of the PCI adapter 30 can control the alarm circuit 36 to report a fault alarm when the operation power of the PCI cards 41, 42, 43 exceed the threshold power of the PCI expansion slots 31, 32, 33, with the fault alarm, the user may take some action to avoid the PCI adapter 30 is burned out, and thus reliability of the PCI adapter 30 is also improved.

It is to be understood that the described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The disclosure illustrates but does not restrict the scope of the disclosure.

What is claimed is:

1. A peripheral component interconnect (PCI) adapter, comprising:
   a PCI connector connectable to a PCI slot of a motherboard;
   a first PCI expansion slot connectable to a first PCI card;
   a second PCI expansion slot connectable to a second PCI card;
   a detection control circuit connected to the first PCI expansion slot and the second PCI expansion slot;
   an alarm circuit connected to the detection control circuit; and
   an alarm switch connected to the detection control circuit;
   wherein the alarm switch is configured to enable or disable alarm control function of the detection control circuit by outputting an enablement signal or a disablement signal to the detection control circuit; and the detection control circuit is configured to detect operation power of the first PCI card and the second PCI card, and to control the alarm circuit to report a fault alarm when the operation power of the first PCI card exceeds a threshold power of the first PCI expansion slot or the operation power of the second PCI card exceeds a threshold power of the second PCI expansion slot.

2. The PCI adapter of claim 1, wherein the alarm circuit comprises a first indicator lamp that indicates the operation power of the first PCI card exceeds the threshold power of the first PCI expansion slot.

3. The PCI adapter of claim 2, wherein upon determining that the operation power of the first PCI card exceeds the threshold power of the first PCI expansion slot, the detection control circuit outputs a first control signal to the alarm circuit, the first control signal is configured to control the alarm circuit to light the first indicator lamp or to make the first indicator lamp flicker.

4. The PCI adapter of claim 2, wherein the alarm circuit further comprises a second indicator lamp that indicates the operation power of the second PCI card exceeds the threshold power of the second PCI expansion slot.

5. The PCI adapter of claim 4, wherein upon determining that the operation power of the second PCI card exceeds the threshold power of the second PCI expansion slot, the detection control circuit outputs a second control signal to the alarm circuit, the second control signal is configured to control the alarm circuit to light the second indicator lamp or to make the second indicator lamp flicker.

6. The PCI adapter of claim 1, wherein the alarm circuit further comprises a buzzer, and upon determining that the operation power of one of the first PCI card and the second PCI card exceeds the threshold power of the corresponding one of the first PCI expansion slot and the second PCI expansion slot, the detection control circuit controls the alarm circuit to ring the buzzer.

7. The PCI adapter of claim 1, wherein the alarm switch comprises a three-terminal key, the three-terminal key comprises a first terminal being grounded, a second terminal electrically connected to the detection control circuit, and a third terminal electrically connected to a power voltage.

8. The PCI adapter of claim 7, wherein When the three-terminal key is pressed, the second terminal is electrically connected to the third terminal to receive the power voltage, and the power voltage serves as the enablement signal and is output to the detection control circuit to enable the alarm control function of the detection control circuit.

9. The PCI adapter of claim 7, wherein when the three-terminal key is released, the second terminal is electrically connected to the first terminal to receive a ground voltage, and the ground voltage serves as the disablement signal and is output to the detection control circuit to disable the alarm control function of the detection control circuit.

10. A computer, comprising:
    a motherboard comprising a plurality of peripheral component interconnect (PCI) slots; and
    a PCI adapter, comprising:
      a PCI connector connecting to one of the PCI slot of the motherboard;
      a plurality of PCI expansion slots for connecting PCI cards respectively;
      a detection control circuit connected to the plurality of PCI expansion slots;
      an alarm circuit connected to the detection control circuit; and
      an alarm switch connected to the detection control circuit;

wherein the alarm switch is configured to enable or disable alarm control function of the detection control circuit by outputting an enablement signal or a disablement signal to the detection control circuit; the detection control circuit is configured to detect operation power of the PCI cards, and to control the alarm circuit to report a fault alarm when the operation power of any one of the PCI cards exceeds a threshold power of a corresponding one of the PCI expansion slots.

11. The computer of claim 10, wherein the plurality of PCI expansion slots comprises a first PCI expansion slot for connecting a first PCI card, and the alarm circuit comprises a first indicator lamp for indicating the operation power of the first PCI card exceeds the threshold power of the first PCI expansion slot.

12. The computer of claim 11, wherein upon determining that the operation power of the first PCI card exceeds the threshold power of the first PCI expansion slot, the detection control circuit outputs a first control signal to the alarm circuit, the first control signal is configured to control the alarm circuit to light the first indicator lamp or to make the first indicator lamp flicker.

13. The computer of claim 11, wherein the plurality of PCI expansion slots further comprises a second PCI expansion slot for connecting a second PCI card, the alarm circuit further comprises a second indicator lamp for indicating the operation power of the second PCI card exceeds the threshold power of the second PCI expansion slot.

14. The computer of claim 13, wherein upon determining that the operation power of the second PCI card exceeds the threshold power of the second PCI expansion slot, the detection control circuit outputs a second control signal to the alarm circuit, the second control signal is configured to control the alarm circuit to light the second indicator lamp or to make the second indicator lamp flicker.

15. The computer of claim 10, wherein the alarm circuit further comprises a buzzer, and upon determining any one of the PCI cards exceeds a threshold power of a corresponding one of the PCI expansion slots, the detection control circuit outputs a buzzer control signal to control the alarm circuit, the buzzer control signal is configured to control the alarm circuit to ring the buzzer.

16. The computer of claim 10, wherein the alarm switch comprises a three-terminal key, the three-terminal key comprises a first terminal being grounded, a second terminal electrically connected to the detection control circuit, and a third terminal electrically connected to a power voltage.

17. The computer of claim 16, wherein When the three-terminal key is pressed, the second terminal is electrically connected to the third terminal to receive the power voltage, and the power voltage serves as the enablement signal and is output to the detection control circuit to enable the alarm control function of the detection control circuit.

18. The computer of claim 16, wherein when the three-terminal key is released, the second terminal is electrically connected to the first terminal to receive a ground voltage, and the ground voltage serves as the disablement signal and is output to the detection control circuit to disable the alarm control function of the detection control circuit.

* * * * *